United States Patent [19]
Cook

[11] 3,782,508
[45] Jan. 1, 1974

[54] RELEASABLE CALIPER RETAINING MEANS FOR A DISC BRAKE

[75] Inventor: Harry E. Cook, Detroit, Mich.

[73] Assignee: Ford Motor Company, Dearborn, Mich.

[22] Filed: July 2, 1971

[21] Appl. No.: 159,377

[52] U.S. Cl............................... 188/73.3, 188/73.5
[51] Int. Cl............................................ F16d 55/224
[58] Field of Search................ 188/73.3, 73.5, 73.6, 188/72.4

[56] References Cited
UNITED STATES PATENTS

| | | | |
|---|---|---|---|
| 3,612,226 | 10/1971 | Pauwels et al. | 188/73.3 |
| 3,625,314 | 12/1971 | Rinker | 188/73.3 |
| 3,310,135 | 3/1967 | Wells | 188/73.6 |
| 3,616,876 | 11/1971 | Brooks | 188/73.3 |
| 3,168,167 | 2/1965 | Walther | 188/73.3 |

FOREIGN PATENTS OR APPLICATIONS

| | | | |
|---|---|---|---|
| 1,207,328 | 9/1970 | Great Britain | 188/73.3 |

Primary Examiner—George E. A. Halvosa
Attorney—Keith L. Zerschling et al.

[57] ABSTRACT

A disc brake for a motor vehicle having an anchor plate secured to a wheel support member. A brake caliper is slidably supported on the anchor plate and straddles a brake rotor. The caliper is constructed to urge a pair of brake shoes into engagement with the braking surfaces of the rotor. A unique releasable retaining means secures the caliper to the anchor. In the presently preferred embodiment, the unique releasable retaining means comprises a sheet metal spring clip and a V-shaped key interposed between the caliper and anchor.

19 Claims, 10 Drawing Figures

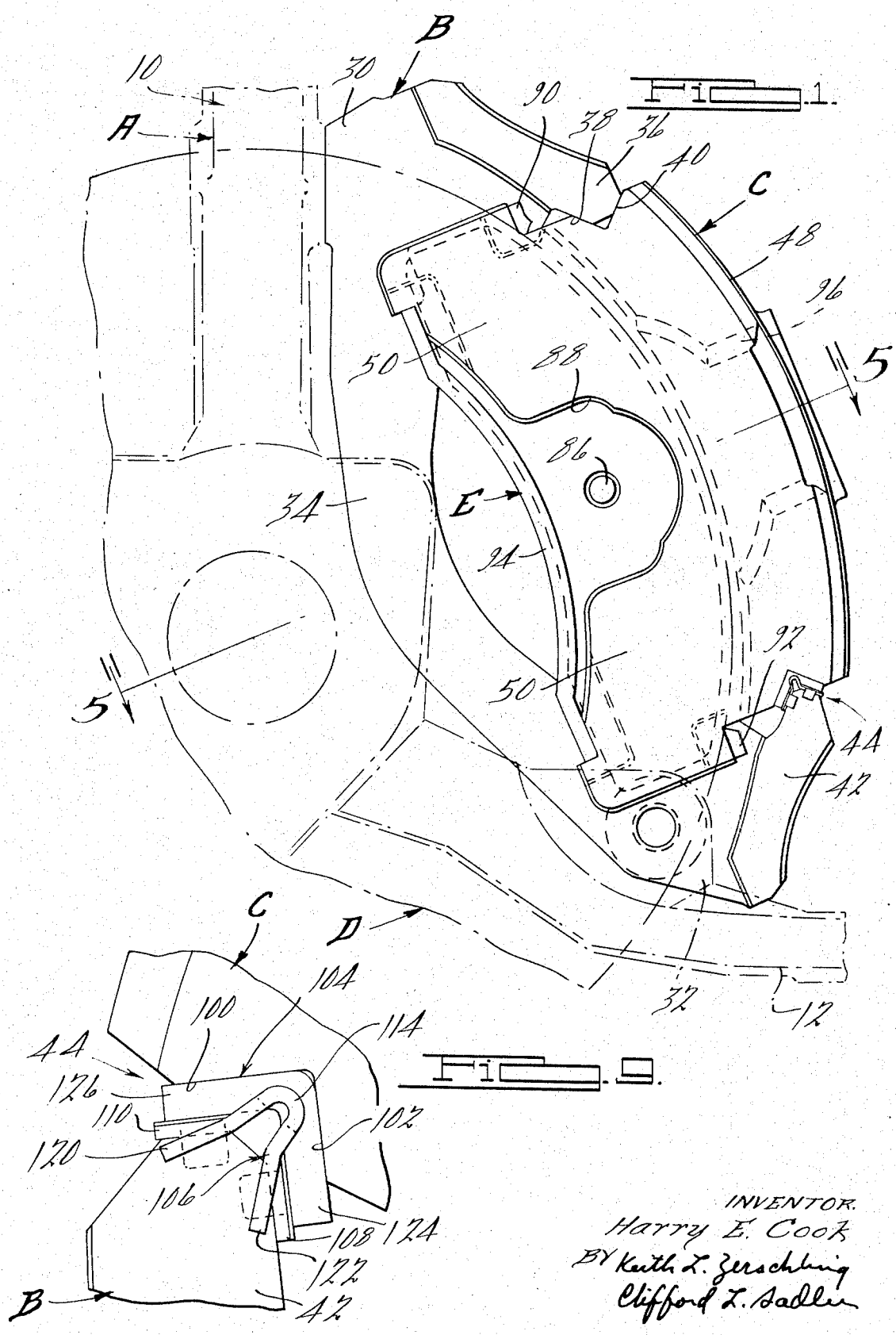

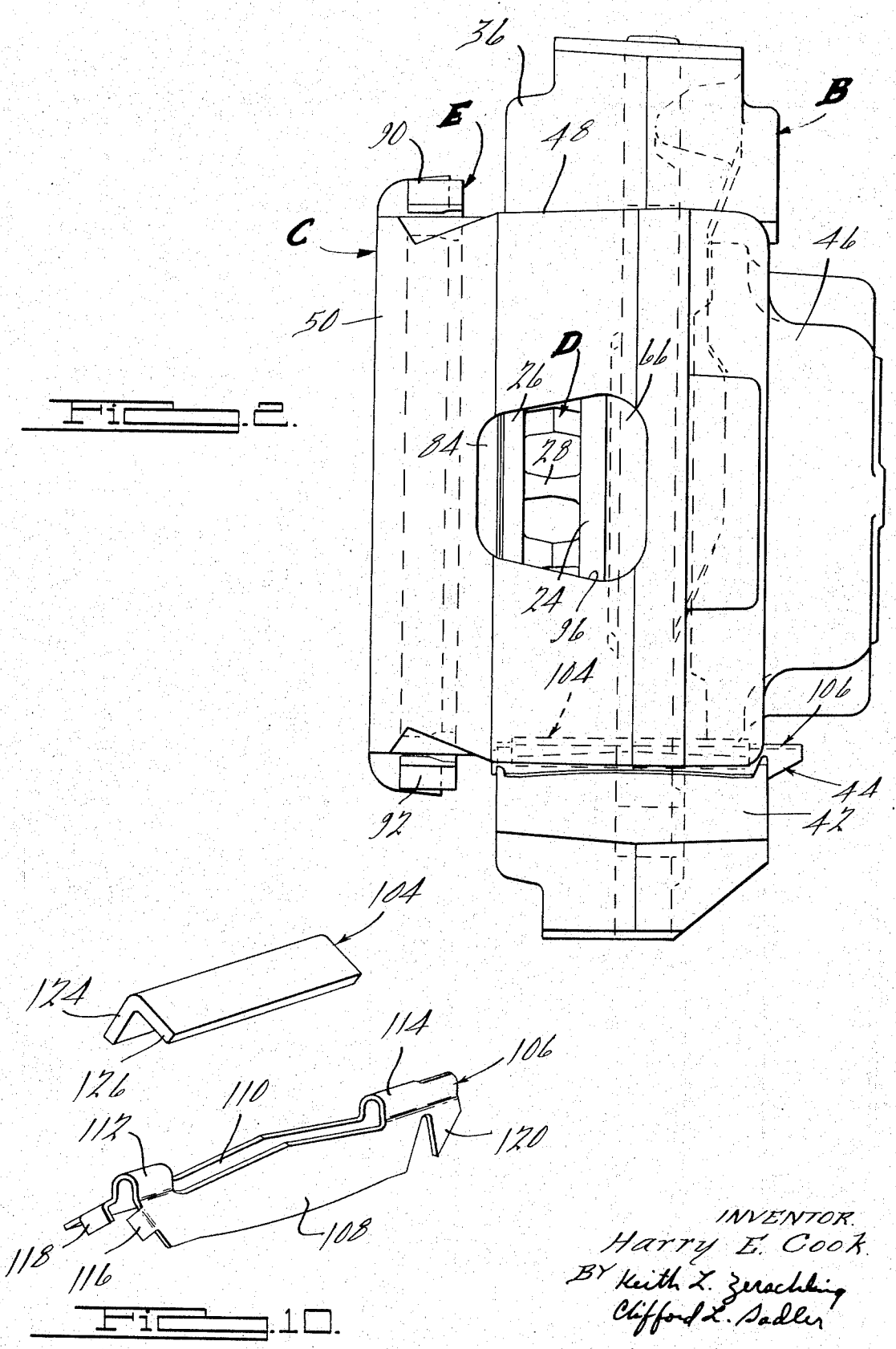

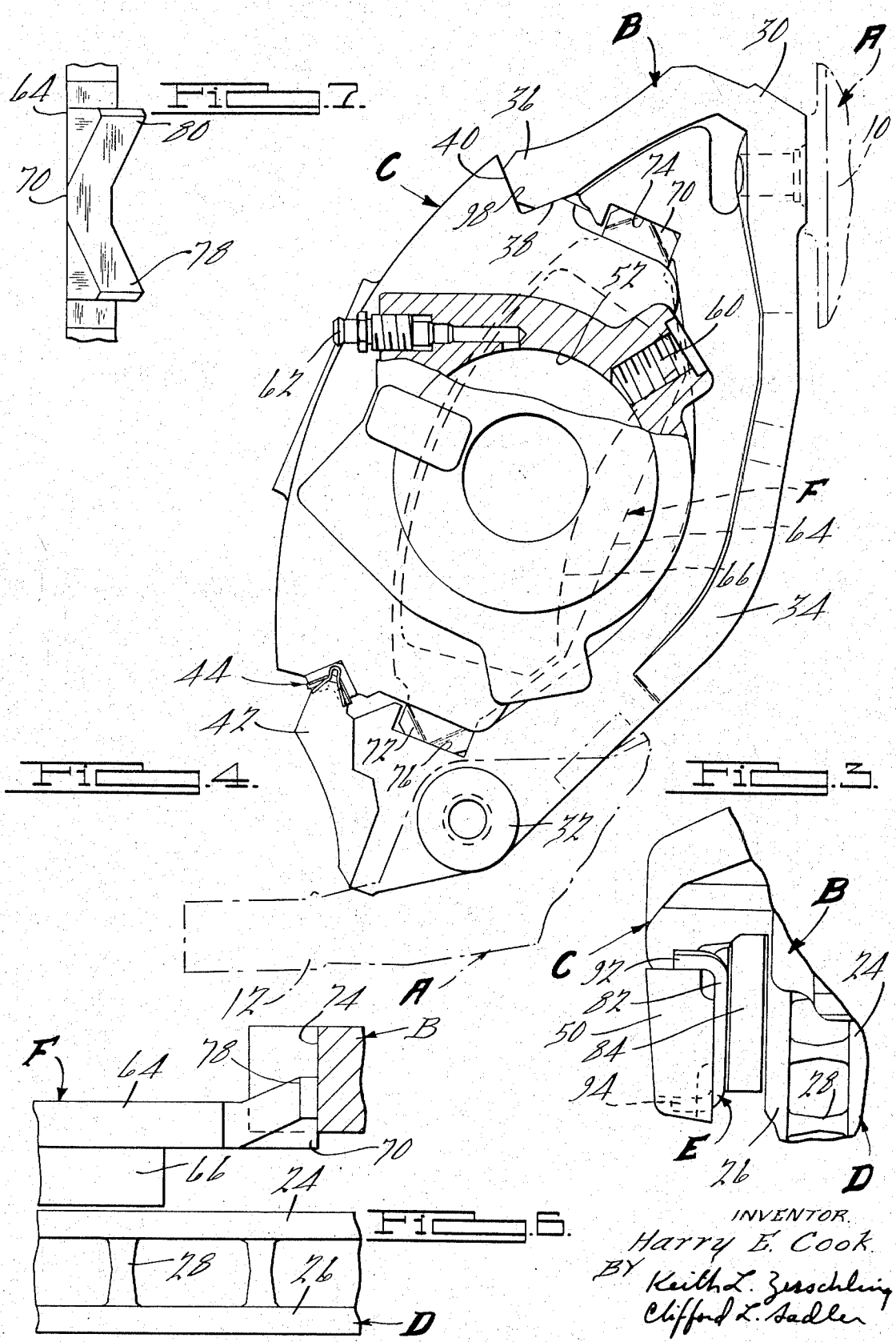

INVENTOR.
Harry E. Cook
BY Keith L. Zerschling
Clifford L. Sadler
ATTORNEYS.

000
RELEASABLE CALIPER RETAINING MEANS FOR A DISC BRAKE

BACKGROUND OF THE INVENTION

The present invention relates to motor vehicle disc brakes in general, and is particularly useful in disc brakes of the floating caliper type. Among other things, the present invention is concerned with means for securing the brake caliper to the anchor plate while permitting the caliper to slide parallel to the axis of rotation of the wheel during a brake application.

It is one of the principal objects of the present invention to provide a caliper retaining means that is of simple construction and reliable in operation. It is another object to provide a retaining means that may be readily removed from the disc brake assembly to permit the ready disengagement of the caliper from the anchor.

BRIEF SUMMARY OF THE DISCLOSURE

In the presently preferred embodiment of this invention, a wheel spindle of a motor vehicle front suspension rigidly supports a disc brake anchor or torque plate. In addition, the spindle rotatably supports a disc brake rotor. A brake caliper straddles the rotor and is in slidable engagement with the anchor plate. Brake shoes are provided on either side of the rotor which are constructed to be urged by the caliper into frictional engagement with the rotor.

The caliper has a pair of V-shaped grooves that extend parallel to the axis of rotation of the rotor. The anchor plate has a guide member that slidably engages the first of the V-shaped grooves. The anchor plate has a guide support spaced from the second V-shaped caliper groove. A releasable retaining means is interposed between the guide support and the second groove.

The releasable retaining means comprises a sheet metal spring clip engaging the anchor's guide support and a V-shaped key interposed between the clip and the second caliper groove. The caliper is in slidable engagement with the V-shaped key. The spring clip exerts a force tending to urge the first V-shaped caliper groove into engagement with the guide member of the anchor plate.

This disc brake construction permits the caliper to slide in a direction parallel to the axis of rotation of the brake rotor during a brake application. As the caliper slides, the first of its V-shaped groove is in sliding engagement with the V-shaped key.

In the preferred embodiment of the present invention, the outboard brake shoe is carried by the caliper and, therefore, brake torque is transmitted from the caliper to the anchor plate through the inclined surfaces which form the grooves. The direction of rotation of the brake rotor determines which of the surface carries the braking torque.

The brake caliper is removed from engagement with the anchor plate by first forcibly deflecting retaining barbs provided on the spring clip so that the clip and key may be slipped through the gap between the anchor's guide support and the caliper's second groove. With the retaining means (the key and clip) removed, the caliper is then free to swing radially outwardly away from engagement with the anchor plate. The caliper is free to pivot about its engagement with the guide member on the anchor plate with the edges of the caliper's second groove clearing the guide member.

BRIEF DESCRIPTION OF THE DRAWINGS

The many objects and advantages of a disc brake constructed in accordance with the present invention will become apparent upon consideration of the following detailed description and the accompanying drawings, in which:

FIG. 1 is an elevational view of the outboard side of a disc brake assembly embodying a presently preferred form of this invention;

FIG. 2 is a rear elevational view of the disc brake assembly of FIG. 1;

FIG. 3 is an end view of a portion of the disc brake assembly;

FIG. 4 is an elevational view, partly in section, of the inboard side of the disc brake assembly of FIG. 1;

FIG. 6 is a plan view (slightly enlarged) showing a portion of the inboard brake shoe and lining assembly, brake rotor and the anchor plate of the disc brake assembly;

FIG. 7 is an end view (slightly enlarged) of the inboard brake shoe shown in FIG. 6;

FIG. 9 is an end view (slightly enlarged) of the inboard end of the retaining key and spring clip; and FIG. 10 is a perspective view of the retaining key and the spring clip of FIGS. 8 and 9.

DETAILED DESCRIPTION OF THE PREFERRED EMBODIMENT

Figure 5:
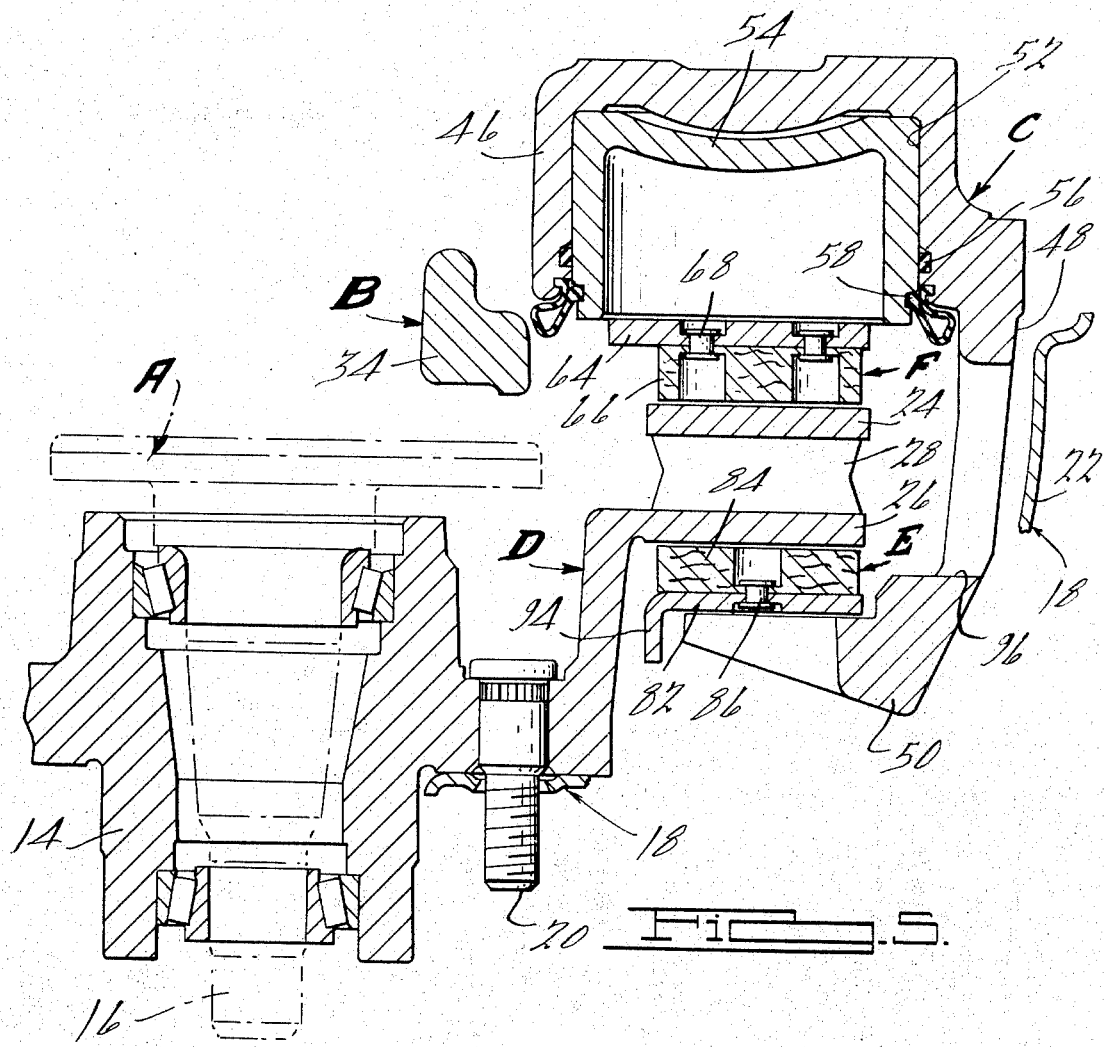
FIG. 5 is a sectional view taken along section line 5—5 of FIG. 1.
Figure 8:
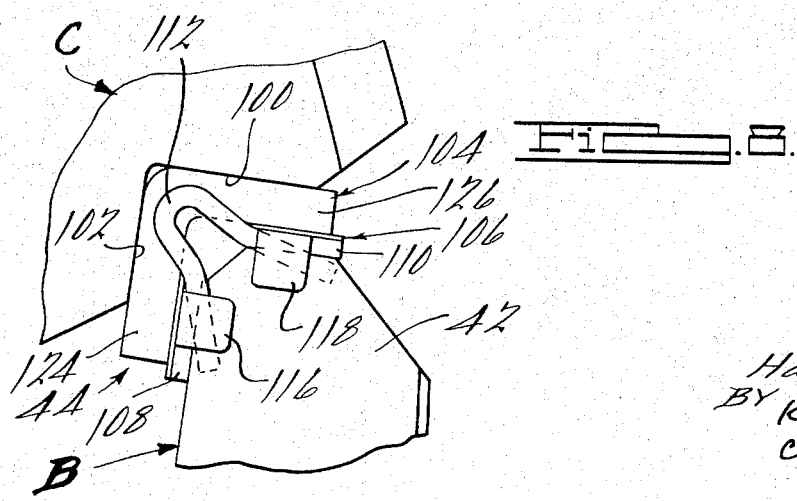
FIG. 8 is an end view (slightly enlarged) of the outboard end of the retaining key and spring clip with adjacent portions of the caliper and anchor also shown.

Referring now to the drawings for a detailed description of the presently preferred embodiment of this invention, FIG. 1 illustrates a disc brake assembly for the left front wheel of a motor vehicle.

In FIG. 1, the assembly includes a wheel spindle A to which an anchor or torque plate B is rigidly secured. A floating brake caliper C is slidably supported on the anchor B. The caliper C straddles a brake rotor D that is rotatably supported on the spindle A. The brake assembly includes an outboard brake shoe and lining assembly E which is supported on the caliper C and an inboard brake shoe and lining assembly F which is supported on the anchor B. A hydraulic motor within the caliper C is constructed to draw the brake shoe and assemblies E and F together and clamp the brake rotor D therebetween. When the rotor D is clamped, braking torque is transmitted from the outboard shoe and lining assembly E through the caliper C to the anchor B. Braking torque exerted on the inboard shoe and lining assembly F is transmitted directly to the anchor B.

The wheel spindle A forms a part of an independent front suspension system for a motor vehicle and is constructed to be connected to upper and lower suspension arms. The spindle A includes an upwardly extending arm 10 which is designed to receive a ball joint assembly for connection with the upper suspension arm. The lower suspension arm connects to the spindle A at a point not shown in the drawings. The spindle A also includes a rearwardly extending steering arm 12 that is constructed to be connected to the steering linkage of the motor vehicle. The spindle A still further comprises a spindle shaft 16.

Referring to FIG. 5, the brake rotor D has a generally hat-shaped construction with a hub portion 14 that is rotatably supported on the shaft portion 16 of the spindle A by means of spaced roller bearings. A road wheel 18 is secured to the hub of the rotor D by means of circumferentially spaced bolts 20. The wheel 18 includes a rim portion 22 which is designed to support a pneumatic tire.

The rotor D includes inboard and outboard annular braking surfaces 24 and 26. The members which form the braking surfaces 24, 26 are separated by fins 28. The fins 28 are circumferentially spaced apart so as to provide radial passages between the braking surfaces 24, 26 for the flow of cooling air. Due to the spacing of the braking surfaces 24, 26 and the passages formed by the fins 28, the rotor D is of the type which is sometimes referred to as a ventilated rotor.

The anchor or torque plate B includes a first portion 30 that is bolted to the upright arm 10 and a second portion 32 that is bolted to the steering arm 12 of the spindle A. A bridging member 34 extends between the first and second anchor plate attaching portions 30 and 32. The anchor plate B includes a guide member 36 having a pair of guide surfaces 38 and 40. The guide surfaces 38, 40 are situated radially outwardly beyond the periphery of the rotor D and support portion of the caliper C. The surfaces 38 and 40 support an adjacent portion of the caliper C. The anchor B also includes a guide support 42 situated adjacent to the anchor attaching portion 32. The guide support 42 is situated radially outwardly of the rotor D and extends axially across its periphery. Guide support 42 supports a releasable retaining means 44 that engages the caliper C as will be described in greater detail later.

The brake caliper assembly C straddles the rotor D and is in slidable engagement with the anchor B. Referring to FIG. 5, the caliper C includes a casting having a hydraulic cylinder portion 46, a bridging portion 48 that spans the periphery of the rotor D and a reaction portion 50 situated adjacent the outboard braking surface 26 of rotor D.

The hydraulic cylinder portion 46 of the caliper C includes a cylinder bore 52 in which a piston 54 is slidably received. An annular seal 56 seals the clearance between the cylinder bore 52 and the piston 54. A flexible boot seal 58 is interposed between the cylinder body 46 and the piston 54 to protect the cylinder bore 52 from contamination.

As seen in FIG. 4, a port 60 passes through the body of the cylinder portion 46 and connects with the interior of the cylinder bore 52. Port 60 provides a means for connecting a hydraulic pressure source (such as a brake master cylinder) to the chamber situated between the end of the piston 54 and the end of the cylinder bore 52. Fitting 62 provides a means for bleeding air from the hydraulic chamber in a well-known manner for a well-known purpose.

The inboard brake shoe and lining assembly F includes a rigid metal brake shoe 64 to which a frictional brake lining 66 is secured by means of rivets 68. The brake lining 66 is generally smaller than the brake shoe 64. The inboard brake shoe 64 has extending end portions 70 and 72 that fit within generally rectangular guide grooves 74 and 76 provided in the anchor plate B. The rectangular grooves 74, 76 provide guide means for the displacement of the inboard brake shoe and lining assembly F in an axial direction toward the braking surface 24 of rotor D.

The inboard brake shoe and lining assembly F is interposed between the piston 54 and braking surface 24 of the rotor D with the piston arranged to engage the backside of the shoe 64. The lining 66 has a friction face that is constructed to engage the friction surface 24 of the rotor D.

End 70 constitutes the leading end of the brake shoe 64 and end 74 the trailing end, as determined by the normal direction of rotation of the brake rotor D.

As seen in FIGS. 6 and 7, the corners 78 and 80 of the leading end 70 of the inboard shoe 64 are each bent along a diagonal in a direction away from the lining 66 and away from the braking surface 24 of rotor D. In the end view (FIG. 7), the end surface of the shoe 64 has a V-shaped configuration. The V-shape produced by angling of the corners 78 and 80 provides an increased effective thickness to the bearing surface of the shoe end 70 which engages the depth of the groove 74 of anchor B.

The trailing end 72 of the inboard brake shoe 64 has its corners bent along diagonal lines in the same fashion as the end 70 shown in FIGS. 6 and 7.

The outboard brake shoe and lining assembly E is secured to the reaction portion 50 of caliper C and comprises a stamped metal shoe 82 to which a brake lining 84 is affixed by means of a series of rivets 86.

The reaction portion 50 of the caliper C is bifurcated by a central recess 88. The outboard brake shoe 82 has edge portions that are turned or bent to form flanges which grip the bifurcated parts of the caliper reaction portion 50. The gripping flanges include bent over tabs 90 and 92 (FIGS. 1, 2 and 3) situated at the corners of the shoes 82. The lower edge of the outboard brake shoe 82 is provided with an extended flange 94. The ends of the flange 94 engage the bifurcated parts of the reaction portion 50 whereby the parts are trapped between the ends of flange 94 and the tabs 90 and 92. This flange arrangement secures the outboard brake shoe and lining assembly E to the caliper C.

The bridging portion 48 of the caliper C which spans the periphery of the rotor D and interconnects the cylinder portion 46 and reaction portions 50 is provided with a central opening 96. The opening 96 serves as a means for permitting the visual inspection of the linings 66 and 84 of the inboard and outboard brake shoe and lining assemblies F and E.

Means are provided in accordance with the present invention for slidably supporting and releasably securing the caliper C to the anchor plate B. One edge of the bridging portion 48 of caliper C is provided with a V-shaped axially extending groove 98. The angled surfaces which form the V-shaped groove 98 complement the inclined surfaces 38 and 40 of the guide member 36 of anchor plate B. In operation, the inclined surfaces of the V-shaped caliper groove 98 are in slidable supporting engagement with inclined surfaces 38 and 40.

Similarly, angled surfaces 100 and 102 define a V-shaped groove at the opposite edge of the bridging portion 48 of caliper C. The releasable retaining means 44 is interposed between the guide support 42 and the V-shaped groove formed by the angle surfaces 100, 102. The releasable retaining means 44 provides slidable supports for the caliper C and, in addition, a means for removing the caliper from engagement with the anchor B.

The releasable retaining means 44 includes a rigid key 104 of generally V-shaped construction and a spring clip 106. The key 104 and clip 106 extend axially across the periphery of the rotor D. The clip 106 is supported by the guide support 42 of the anchor plate B. The key 104 is interposed between the clip 106 and the V-shaped groove formed by the caliper surfaces 100 and 102.

Referring to FIG. 10, the spring clip 106 has slightly curved or bowed side portions 108 and 110 that are interconnected adjacent their ends by integral, semi-cylindrical portions 112 and 114. The outboard end of the side portions 108 and 110 is provided with locating tabs 116 and 118. The inboard end of the clip 106 is provided with locating barbs 120 and 122.

The key 104 is formed with intersecting side portions 124 and 126. The bowed side portions 108 and 110 of the clip 106 together with the spaced semi-cylindrical interconnecting portions 112 and 114 form a saddle upon which the V-shaped key 104 is seated.

When the retaining means 44 comprising the key 104 and clip 106 is interposed between the guide support 42 and caliper C, the key sides 124 and 126 are in slidable engagement with the surfaces 102 and 100, respectively, of the caliper groove. The guide support 42 of the anchor B has inclined surfaces upon which the bowed sides 108 and 110 of the clip 106 are seated. The width of the guide support 42 is equal to the distance between the locating tabs 116 and 118 and the barbs 120 and 122. When the retaining means 44 is interposed between the guide support 42 and caliper C, the tabs 116 and 118 are seated against the outboard side of the guide support 42 and the barbs 120 and 122 engage the inboard side of the guide support 42.

As explained earlier, the longitudinal extending portions 108 and 110 of the clip 106 are slightly bowed whereby a spring force is exerted which tends to urge the retaining key 104 into engagement with the surfaces 100 and 102. This force also tends to urge the groove 98 of the opposite side of the caliper C into engagement with the surfaces 38 and 40 of the anchor guide member 36.

OPERATIONS

The disc brake assembly shown and the drawing is constructed for use in association with the left front wheel of an automobile. The brake rotor D rotates in a counterclockwise direction as seen in FIG. 1 during forward movement of the vehicle. During a brake application, pressure fluid is admitted through the port 60 into the chamber between the piston 54 and the depth of the bore 52. Pressure fluid in this chamber causes the piston 54 to move toward the brake rotor D (see FIG. 5). This action forces the inboard brake shoe and lining assembly F to move into engagement with the annular friction surface 24 of the rotor D. The inboard brake shoe and lining assembly F is guided in its movement toward the rotor D by its leading and trailing ends 70 and 72 which slide in the anchor plate grooves 74 and 76.

The bridge portion 48 of caliper C is in slidable engagement with the guide member 36 of anchor B and the releasable retaining means 44 connected to guide support 42. When the pressure chamber of cylinder 52 is pressurized with hydraulic fluid, the piston 54 and inboard brake shoe and lining assembly F move toward the rotor 20. The body of caliper C is displaced in the opposite direction by the pressurization of the chamber. This causes the reaction portion 50 to draw the outboard brake shoe and lining assembly F into engagement with the annular friction face 26 of rotor D. Thus, when the chamber of cylinder bore 52 is pressurized with hydraulic fluid, the caliper C is activated to cause the inboard and outboard brake shoe and lining assemblies F and E to trap the rotor D.

When the linings 66 and 94 engage te rotor D, they will tend to shift laterally in the direction of rotor rotation. Rotation of the inboard brake shoe and lining assembly F will be resisted and prevented by the engagement of the leading end 70 of the shoe 64 with the depth of the groove 74 in anchor B. The outboard brake shoe and lining assembly F is secured to the caliper casting C so that when it is drawn into engagement with the rotor D, braking torque will be transmitted through the caliper C to the guide member 36.

When the vehicle having the disc brake of FIG. 1 is moving in reverse, the rotor D will be turning in a clockwise direction. A brake application under these circumstances will cause the inboard brake shoe and lining assembly F to transmit braking torque through the normally trailing end 72 to the anchor plate groove 76. Braking torque for the outboard shoe and lining assembly E will be transmitted through the caliper C and the releasable retaining means 44 to the guide support 42.

It will be noted from FIGS. 6 and 7 that the corners 78 and 80 of the leading end 70 of inboard brake shoe 64 are angularly bent whereby the effective thickness of the shoe 64 is increased. This unique construction acts to stabilize the support for the brake shoe 64. In addition, it increases the effective thickness of the brake shoe so that when the lining 66 becomes worn, the corner portions of the end face of the leading end 70 will remain in engagement with the depth of the guide groove 74 (see FIG. 6). The trailing end 72 is similarly constructed with bent corners which provide a V-shaped end face in engagement with the guide groove 76.

The condition of the linings 66 and 84 can be determined by visual observation through the hole 96 in the bridge portion 48 of caliper C. If it is determined that the linings are worn and need to be replaced, the caliper C may be removed from engagement with the anchor B by removal of the releasable retaining means 44.

This is done by forcibly spreading the barbs 120 and 122. When the barbs 120 and 122 are spread apart sufficiently so as to be in alignment with the space between the guide support 42 and the caliper surfaces 100 and 102, the releasable retaining means 44 comprising the clip 106 and key 104 may be axially displaced out of engagement with the anchor B and caliper C. The gap between the guide 42 and the inclined surfaces 100 and 102 is then exposed.

To remove the caliper C, it is merely necessary to pivot it about the contact between the groove 98 and the inclined surfaces 38 and 40. The key 104 and clip 106 are designed to be of sufficient thickness so that when they are removed, a large enough gap will be provided to permit the edge of surface 102 to clear the end of the guide support 42 as it is swung radially outwardly.

Once the caliper C is removed from engagement with the anchor B, the outboard brake shoe and lining assembly F may be forcibly removed from the reaction portion 50 of the caliper C for replacement purposes. With the caliper C out of the way, the inboard brake shoe and lining assembly F may be removed in an axial direction from the grooves 74, 76 of anchor B for replacement purposes.

In accordance with a slightly alternate procedure for disassembling the brake, the key 104 and spring clip 106 are first removed. This is achieved by first splaying the barbs 120 and 122 outwardly and then displacing the parts axially as described above. The caliper C is then shifted circumferentially to close the gap left by the removed key 104 and clip 106 whereby the guide support 42 is placed in nested engagement ith the V-shaped groove of surfaces 100 and 102. The caliper C is then free to pivot about its engagement with guide support 42 in an outward direction. The edges of the groove 98 will clear the guide member 36 of anchor B.

It is to be noted that the minimum distance between the guide member 36 and guide support 42 is less than the maximum width of the bridging portion 48 of caliper C so that either the guide member 36 must be nested in the 98 or the guide support 42 nested In the groove of surfaces 100, 102 in order to permit the radial removal of the caliper C after the key 104 and clip 106 are removed.

SUMMARY

In accordance with the presently preferred embodiment of this invention, a unique disc brake assembly is provided having a simplified caliper retaining means which may be readily removed to permit the caliper to be displaced in a radially outward direction from its engagement with the anchor for servicing the inboard and outboard brake shoe and lining assemblies.

THe foregoing description presents the preferred embodiment oF this invention. Modifications and alterations may occur to those skilled in the art which will come within the scope and spirit of the following claims.

I claim:

1. A disc brake for a motor vehicle having a stationary anchor member, a rotatable rotor, a pair of brake shoe and lining assemblies disposed adjacent said rotor, a housing member straddling said rotor and connected to said anchor member, said housing member having means constructed to urge said brake shoe and lining assemblies into frictional engagement with the sides of said rotor, said anchor member having circumferentially spaced apart integral nonresilient first and second support portions, said housing member having first and second housing portions, said first housing portion directly engaging said first support portion, releasable retaining means interposed between said second support portion and said second housing portion, said releasable retaining means in combination with said direct engagement of said first portions being constructed to provide the sole means preventing displacement of said housing member radially inwardly and radially outwardly, said releasable retaining means comprising only one key and only one spring, said key comprising a rigid key engaging one of said second portions, said spring comprising a spring clip interposed between said key and the other of said second portions, said spring clip being constructed to prevent the axial displacement of said key relative to said other second portion, said key and spring clip being releasable from their interposed position whereby said housing member may be removed from said anchor member, said spring clip being constructed to exert a circumferentially directed spring force urging said housing member in a circumferential direction and said first housing portion into direct engagement with said first support portion.

2. A disc brake for a motor vehicle having a stationary anchor member, a rotatable rotor, a pair of brake shoe and lining assemblies disposed adjacent said rotor, a housing member straddling said rotor and connected to said anchor member, said housing member having means constructed to urge said brake shoe and lining assemblies into frictional engagement with the sides of said rotor, said anchor member having circumferentially spaced apart integral nonresilient first and second support portions, said housing member having spaced apart first and second housing portions, said first housing portion directly engaging said first support portion, said second housing portion being circumferentially spaced from said second support portion, the minimum distance between said first and second support portions being less than the maximum width of said housing member between said first housing portion and said second housing portion, resilient releasable retaining means interposed between said second support portion and said second housing portion, said resilient releasable retaining means in combination with the direct engagement between said first portions being constructed to provide the sole means preventing displacement of said housing member radially inwardly and radially outwardly, said resilient releasable retaining means being secured against axial displacement relative to one of said second portions and slidably engaging the other of said second portions, said resilient releasable retaining means comprising only one key and only one spring, said key comprising a rigid key slidably engaging said other second portion, said anchor member and said housing member being constructed so that when said resilient releasab'e retaining means is removed from its interposed position between said second portions a gap of sufficient size is provided between said second support portion and said second housing portion whereby said housing member may be displaced radially outwardly away from said rotor, said spring being constructed to exert a circumferentially directed spring force urging said housing member in a circumferential direction and said first housing portion into direct engagement with said first support portion.

3. A disc brake for a motor vehicle having a stationary anchor member, a rotatable rotor, a pair of brake shoe and lining assemblies disposed adjacent said rotor, a housing member straddling said rotor and connected to said anchor member, said housing member having means constructed to urge said brake shoe and lining assemblies into frictional engagement with the sides of said rotor, said anchor member having circumferentially spaced apart integral nonresilient first and second support portions, said housing member having spaced apart first and second housing portions, said first housing portion directly engaging said first support portion, said second housing portion being spaced apart from said second support portion releasable retaining means interposed between said second support portion and said second housing portion, said releasable retaining means in combination with said direct engagement of said first portions being constructed to provide the sole means preventing displacement of said housing member radially inwardly and radially outwardly, said releasable retaining means comprising only one key and only one spring, said key engaging one of said second portions, said spring engaging the other of said second portions, said spacing between said second portions being of sufficient size so that when said retaining means is removed from its interposed position between said second portions a gap of sufficient size is exposed between said second support portion and said second housing portion whereby said housing member may be displaced radially outwardly of said rotor and said anchor member, said spring being constructed to exert a circumferentially directed spring force urging said housing member in a circumferential direction and said first housing portion into direct engagement with said first support portion.

4. A disc brake for a motor vehicle according to claim 3 and including:
said spring comprising a spring clip interposed between said key and said other second portion and constructed to exert a spring force in a circumferential direction tending to separate said key and said other second portion.

5. A disc brake for a motor vehicle according to claim 3 and including:
said spring being constructed to prevent the axial displacement of said key relative to said other second portion.

6. A disc brake for a motor vehicle according to claim 3 and including:
the minimum distance between said first and second support portions being less than the maximum width of said housing member between said first housing portion and said second housing portion.

7. A disc brake for a motor vehicle having a stationary anchor, a rotatable rotor, a pair of brake shoe and lining assemblies disposed adjacent said rotor, a floating caliper straddling said rotor and connected to said anchor, said caliper having means constructed to urge said brake shoe and lining assemblies into frictional engagement with the sides of said rotor, said anchor having circumferentially spaced apart integral nonresilient first and second support portions, said caliper having a first caliper portion directly slidably engaging said first support portion, said caliper having a second caliper portion circumferentially spaced from said second support portion, resilient releasable retaining means interposed between said second support portion and said second caliper portion, said resilient releasable retaining means in combination with the direct engagement between said first portions being constructed to provide the sole means preventing displacement of said caliper radially outwardly and radially inwardly, said resilient releasable retaining means being secured against axial displacement relative to one of said second portions and slidably engaging the other of said second portions, said resilient releasable retaining means comprising only one key and only spring, said key comprising an axially extending rigid key slidably engaging said other second portion, said anchor and said caliper being constructed so that when said resilient releasable retaining means is removed from its connection with said second portions said caliper may be removed from its engagement with said anchor, said spring being constructed to exert a circumferentially directed spring force urging said caliper in a circumferential direction and said first caliper portion into direct engagement with said integral first support portion.

8. A disc brake for a motor vehicle according to claim 7 and including:
said spring being interposed between said key and said anchor, said spring being constructed to exert a spring force tending to separate said key and said anchor.

9. A disc brake for a motor vehicle according to claim 7 and including:
said spring comprising a spring clip interposed between said key and said anchor, said spring clip being constructed to exert a spring force tending to separate said key and said anchor, said spring clip being constructed to prevent the axial displacement of said key relative to said anchor.

10. A disc brake for a motor vehicle according to claim 7 and including:
the minimum distance between said integral first and second support portions being less than the maximum width of said caliper between said first caliper portion and said second caliper portion.

11. A disc brake for a motor vehicle according to claim 7 and including:
said key being disposed outwardly of the periphery of said rotor.

12. A disc brake for a motor vehicle according to claim 10 and including: said key having a pair of flat diverging sides.

13. A disc brake for a motor vehicle having a stationary anchor, a rotatable rotor, a floating caliper straddling said rotor and slidab'y engaging said anchor, a first brake shoe and lining assembly slidably supported by said anchor and disposed adjacent one side of said rotor, a second brake shoe and lining assembly secured to said caliper and disposed adjacent the other side of said rotor, said caliper having a hydraulic motor situated on one side of said rotor and constructed to move both of said assemblies into engagement with said rotor, said anchor having a nonresilient guide member integral therewith situated radially outwardly of the periphery of said rotor and extending in an axial direction, said caliper having a portion slidably engaging said guide member, said anchor having a guide support integral therewith spaced circumferentially from said guide member, resilient releasable retaining means connected to said guide support and slidably engaging said caliper, said resilient releasable retaining means in combination with the engagement between said caliper portion and said guide member being constructed to provide the sole means preventing said caliper from being displaced radially outwardly and radially inwardly relative to said anchor, said resilient releasable retaining means comprising only one key and only one spring, said key comprising a rigid key slidably engaging said caliper, said spring comprising a spring clip interposed between said key and said guide support of said anchor, said spring clip being constructed to exert a circumferentially directed spring force tending to separate said key and said guide support of said anchor, said caliper and said anchor being constructed so that when said key and said clip are removed said caliper may be displaced outwardly from said rotor and said anchor, said caliper being spaced apart from said guide support and said spring clip, said guide support being spaced apart from said key.

14. A disc brake for a motor vehicle according to claim 13 and including:

said spring clip having a pair of bowed side portions, said side portions being interconnected adjacent their ends by integral means, said side portions and said integral means forming a saddle upon which said key is seated, inwardly directed locating tabs disposed adjacent one end of said clip and engaging one side of said guide support, resiliently deflectable locating members disposed adjacent the other end of said clip and engaging the other side of said guide support.

15. A disc brake for a motor vehicle according to claim 13 and including:
said key comprising an elongated member of generally V-shape in cross section.

16. A disc brake for a motor vehicle having a stationary anchor, a rotatable rotor, a floating caliper straddling said rotor and slidably engaging said anchor, said anchor having a nonresilient guide member integral therewith situated radially outwardly of the periphery of said rotor and extending in an axial direction, said caliper having a portion directly slidably engaging said guide member, said anchor having a guide support integral therewith and circumferentially spaced from said guide member, releasable retaining means connected to said guide support and slidably engaging said caliper, said releasable retaining means in combination with the direct engagement between said caliper portion and said guide member being constructed to provide the sole means preventing said caliper from being displaced radially inwardly and radially outwardly relative to said anchor, said releasable retaining means comprising only one key and only one spring, said key having a generally V-shape, said spring comprising a spring clip interposed between said key and said guide support of said anchor, said caliper having a first pair of surfaces slidably engaging said guide member, said caliper having a second pair of surfaces slidably engaging said key, said caliper being spaced apart from said guide support and said spring clip, said guide support being spaced apart from said key, said anchor and said caliper being constructed so that when said key and said spring clip are removed a gap of sufficient size is provided between said guide support and said caliper whereby said caliper may be pivoted about said guide member and displaced radially outwardly away from said rotor.

17. A disc brake for a motor vehicle according to claim 16 and including:
said spring clip having a pair of bowed side portions, said side portions being interconnected adjacent their ends by integral means, said side portions and said integral means forming a saddle upon which said key is seated, inwardly directed locating tabs disposed adjacent one end of said clip and engaging one side of said guide support, resiliently deflectable locating members disposed adjacent the other end of said clip and engaging the other side of said guide support.

18. A disc brake for a motor vehicle according to claim 16 and including:
a first brake shoe and lining assembly slidably supported by said anchor and disposed adjacent one side of said rotor, a second brake shoe and lining assembly secured to said caliper and disposed adjacent the other side of said rotor, said caliper having a hydraulic motor situated on one side of said rotor and constructed to move both of said assemblies into engagement with said rotor.

19. A disc brake for a motor vehicle according to claim 16 and including:
the minimum distance between said guide member and said guide support being less than the maximum width of said caliper between said first and said second pairs of surfaces.

* * * * *